July 26, 1966
J. R. HJALMARSSON
3,262,424
AUTOMATIC DRINKING WATER SUPPLY FOR DOMESTIC ANIMALS Filed Oct. 21, 1965

United States Patent Office 3,262,424
Patented July 26, 1966

3,262,424
AUTOMATIC DRINKING WATER SUPPLY FOR DOMESTIC ANIMALS
Jarl R. Hjalmarsson, Lindsbergsgatan 6A, Uppsala, Sweden
Filed Oct. 21, 1965, Ser. No. 505,130
5 Claims. (Cl. 119—75)

This invention is a continuation-in-part of my prior U.S. application Serial No. 278,144, filed May 6, 1963, now abandoned, for Automatic Drinking Water Supply for Domestic Animals.

The present invention relates to an automatic apparatus for supplying drinking water to domestic animals, in particular, swine, said apparatus comprising a drinking bowl and a valve adapted to be operated by the animal for opening a water supply line. Previously known devices of this kind have been provided with valve operating members adapted, when the head of the animal is introduced into the bowl, to be engaged by the head, the valve thereby being caused to open and the water to flow into the bowl while the animal is drinking. This type of operation obviously involves risk of overflow and splash. Further, the bowl is generally left filled with water after the animal has stopped drinking and in this permanent sump of water and food residues noxious bacterial life may develop.

All these drawbacks are avoided according to the invention by disposing the valve above the drinking bowl in such a position that the animal normally is unable at the same time both to drink and to hold the valve actuated. The bowl is preferably given such a shape conforming to the anatomy of the animal that when introduced into the bowl the animal head, on the one hand, with a reasonable degree of probability will engage a valve actuating element and, on the other hand, will be constrained to take a drinking position requiring a simple shifting movement from the valve actuating position.

When the animal puts the head into the bowl in the search for water it will actuate the valve and water will flow into the bowl as long as the valve is held actuated. While the animal is drinking the water so supplied the valve is unoperated and the animal will empty the bowl prior to making any head movements causing the valve to be actuated again. Alternate valve operation and drinking will continue as long as the animal is thirsty. The animal soon learns to produce a flow of water by the actuation of the valve but, as a rule, the animal will not actuate the valve unless driven by thirst. Hereby the risk of overflow and splashing is eliminated and the boxes are kept dry and comfortable. Due to the fact that fresh water supplied is drunk up before more water is supplied, as a rule, only minor residues of water will be left in the bowl and such residues will comprise the most recently supplied fresh water.

The self-cleaning effect of the apparatus may be further improved by injecting the water from the opened valve into the open upper end of a tube which from the valve extends downward to a position adjacent the deepest point of the bowl. In this way an effective rinsing and cleaning action is obtained whenever the valve is actuated preventing food residues and the like from being permanently deposited on the inner surfaces of the bowl.

In a simple construction of the water supply apparatus of the invention which is most advantageous as far as manufacture and maintenance are concerned the valve is adapted to be opened for the supply of water by a predominantly vertical shifting movement of the valve actuating element. In this case the apparatus is suitably constructed as a compact unit in which the bowl projects from a plate adapted to be attached to a vertical wall and the valve is adapted to be connected to a water supply line extending above the bowl on the same side of the general plane of the plate as the bowl; in this basic construction it is obviously desirable that the valve is easily accessible for cleaning and exchange purposes and further is easily connectable to the water supply line extending freely above the bowl. All these objects are obtained in a preferred embodiment of the invention by disposing an upper deflected portion of said plate in an obliquely upwardly inclined position above the bowl and by attaching the valve in the form of a piston valve through said deflected plate portion in a position suitable for valve opening operation of the piston in an oblique upward direction perpendicularly to said deflected portion, the end of said piston valve opposite to the actuating end being exposed for connection to the water line on the side of said deflected plate portion facing away from the bowl.

Suitably in order to eliminate any risk of damage there are provided protecting walls enclosing the portion of the valve extending from said deflected plate portion towards the bowl with the exception of the actuating member such as an actuating plate or knob, said walls projecting towards said bowl on either side of the valve from said plate or said deflected plate portion or from both parts.

Other objects and advantages of the invention will become apparent from the following description in conjunction with the annexed drawing, in which preferred embodiments are disclosed:

Figure 1:
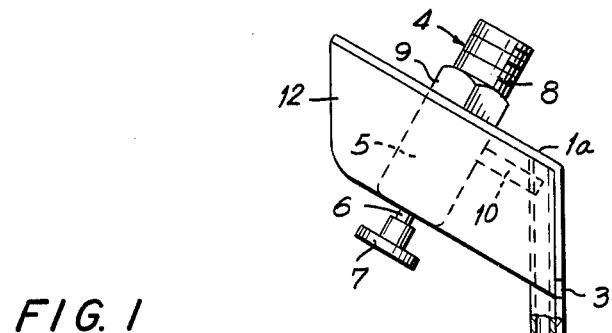
FIG. 1 is a side elevation of a first embodiment of the invention with the lower part of the apparatus, in particular the bowl, shown in section along the vertical center line of the apparatus.

To a rectangular plate 1 of thick plate material of any suitable kind, for example, sheet iron having a thickness of about 3 millimeters, there is attached by welding or other methods a drinking bowl 2 which consists of similar or slightly thicker material than plate 1. As to its shape said bowl may be suitably defined as a sector of a cylindrical tube of which the profile edge 2a forms the generating line and having a slightly greater diameter than the greatest height perpendicularly to profile edge 2a left after cutting along sector edges 2b and 2c. The upper cutting edge 2b thus forms the elliptically elongated upper opening edge of bowl 2, the elliptical contour of said edge being slightly truncated at plate 1, the rear cutting edge 2c forming the attaching edge of the bowl and having an almost circular, somewhat elliptical contour slightly truncated at the upper end. A bowl having the shape as described is particularly suited as a drinking vessel for swine, the soft curvature being well adapted to receive the lower mouth portion of the animal. Plate 1 which is adapted to be fixed to a vertical wall and which for this purpose is provided with a number of screw holes 3 symmetrically distributed about the bowl 2 extends a distance above the bowl opening and is upwardly extended in such a way that an upper deflected portion 1a of the plate projects in an upwardly oblique direction above the bowl 2. The angle enclosed between the plate 1 and the deflected plate portion 1a is from about 125° to about 150°.

Through a hole in the deflected plate portion 1a there is attached a valve 4. In the embodiment shown the valve is a conventional piston valve of arbitrary construction having a piston (not separately shown) disposed within a valve casing 5 and a valve stem 6 connected to the piston and protruding from the valve casing 5 toward said bowl 2, the free protruding end of said valve stem 6 being provided with an actuating element in the form of a knob 7 having a flat surface facing the bowl 2. The portion 8 of the valve casing 5 extending upwardly through said hole in the deflected plate portion 1a is externally threaded enabling the valve to be connected to a water supply line. The valve is fixed to the deflected plate portion by means of a nut 9 screwed onto the threaded portion 8 against the upper face of the deflected portion 1a and drawing a shoulder of the valve casing 5 against the opposite face of the deflected portion. Together with the valve stem 6 the valve piston is adapted to be moved from a lower valve closing position to which the piston is urged by gravity and water pressure to a raised valve opening position in which the piston opens a water flow connection from the connecting portion 8 of the valve to a spout 10 extending laterally from the valve casing 5 towards the plate 1. The end of spout 10 opposite to the valve 4 extends through a hole into the interior of a tube 11 extending on the surface of plate 1 from a point adjacent valve 4 to a point adjacent the deepest portion of bowl 2.

The portion of valve casing 5 facing the bowl is protected against damage by a pair of mutually parallel protecting walls 12 projecting on either side of the valve 4 perpendicularly to said plate 1, said walls 12 consisting of thick plate material and being attached to both the plate 1 and the deflected plate portion 1a as by welding. Valve stem 6 and knob 7 project beyond said walls 12 for actuation by the head of the animal.

The spacing between the lower face of knob 7 and the highest possible water level in bowl 2 is such that a pig normally is unable simultaneously to drink and to hold the knob 7 raised for actuation of the valve 4. The angle between the flat lower face of knob 7 and the surface defined by bowl edge 2b approximately corresponds to the angle between the upper and lower sides of a pig head. When the animal in search for water puts the head into the space above the bowl the probability will be great that the animal will contact and raise the knob 7 and thereby cause water to be discharged from the valve 4 through spout 10 and tube 11 into the bottom of bowl 2. In order to be able to drink the water the animal will be compelled to lower the head whereby the water supply is automatically cut off. The animals will soon find out the connection between actuation of the knob and flow of water and will continue to actuate the knob as long as they are thirsty but no longer.

Figure 2:
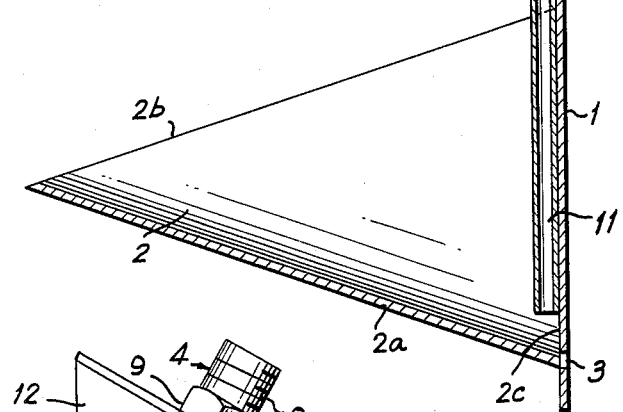
FIG. 2 is a view similar to FIG. 1, showing a second embodiment of the invention.

FIG. 2 shows a second embodiment of the invention. In this embodiment the valve casing has an outlet orifice 100, the tube 10 of the first embodiment being omitted. The tube 111 corresponds to the tube 11 of the first embodiment but is slightly modified, in that the upper end 111a of the tube 111 is inclined so as to extend along the undersurface of the plate extension 1a. The tube extension 111a is optionally secured to the plate extension 1a by any suitable means, such as welding indicated at 112. The open inlet end 113 of tube 111 is located opposite and slightly spaced from the orifice 100. The spacing between the orifice 100 and the tube end 113 is such that, on the one hand, the water pressure ejects the water through the relatively small diameter orifice with sufficient velocity so that substantially all of the water enters the tube end 113. On the other hand, since there is an open space between the orifice 110 and the tube end 113, the water is effectively aerated before entering the tube 111. Thus, an important advantage of this embodiment over the first embodiment is that the second embodiment provides for aeration of the water entering the bowl 2.

While I have disclosed preferred embodiments of my invention, it will be apparent that various changes, omissions and additions may be made in the invention without departing from the scope and spirit thereof.

What is claimed is:

1. An automatic apparatus for supplying drinking water to domestic animals, said apparatus comprising a drinking bowl, a valve disposed above, spaced from and in overlying relationship to said bowl adapted to be connected to a water supply line, said valve having a lateral outlet, a tube having an upper end positioned and adapted relative to said outlet to receive water therefrom when the valve is open, and valve operating means depending from said valve and adapted to be actuated upwardly by the animal to open the valve for injecting water from said supply line through said lateral valve outlet into said tube, said valve returning to normal shut-off position when the actuation of said valve operating means is discontinued, said tube having a tube outlet within said bowl and above the bottom of said bowl, the interior of said tube being inaccessible to the animal between the ends thereof, the spacing between the valve operating means and the tube outlet being such that the animal can consume water at and below the level of said tube only in positions definitely preventing the animal from operating the valve operating means, and so that the animal's head while actuating the valve operating means is prevented from drinking contact with the water from said tube.

2. Apparatus according to claim 1, said valve being upwardly rearwardly inclined.

3. Apparatus according to claim 1, said orifice being spaced from said tube inlet by an amount permitting substantially all of the water from said orifice to enter said tube while permitting aeration of the water in the space between said orifice and said tube.

4. Drinking apparatus for a domestic animal of the type described, said apparatus comprising a drinking bowl having a front end, a peripheral wall, an open top and a downwardly rearwardly inclined bottom wall, a valve casing, means mounting said valve casing above said bowl, said valve casing having an inlet for connection to an external water line and having an outlet, a valve within said casing adapted to control water flow between said inlet and said outlet, a valve actuating member, means mounting said member relative to said casing so that said member is reciprocatingly movable from a lower limit position in a path which is upwardly rearwardly inclined relative to said bowl, said member coupled to said valve so as to maintain it in closed position blocking water flow from said inlet to said outlet when said member is in its lower limit position, so as to be normally maintained by inlet water pressure in said lower limit position and so as to maintain the valve in open position permitting water flow from said inlet to said outlet when said member is raised, means connecting with said outlet and forming a path substantially closed to animal access for flow of water from said outlet into said bowl adjacent the peripheral wall thereof to a point therein adjacent the bottom thereof, said member above overlying and spaced from said bowl, said apparatus having means substantially limiting access of the animal head to said bowl for drinking purposes to movement of said head rearwardly past the front edge of said bottom wall and then downwardly into said bowl, the distance between said member and the lower portion of said bottom wall being sufficiently great clearance of said member by said normal head when said head is in drinking position adjacent said bottom wall.

5. An automatic apparatus for supplying drinking water to domestic animals, said apparatus comprising a drinking bowl, a valve disposed above said bowl adapted to be connected to a water supply line, said valve having a lateral outlet, a tube having an upper end connecting with said lateral valve outlet to receive water therefrom when the valve is open, valve operating means adapted to be actuated by the animal to open the valve for injecting water from said supply line through said lateral valve outlet into the upper end of said tube, the connection between said valve outlet and said upper end being shielded behind said valve and valve operating means, an exposed portion of said tube extending from the valve downward to a position adjacent the deepest point of said bowl, said valve operating means being disposed above said drinking bowl in such a position that the animal is unable at the same time to hold the valve operating means actuated and come into contact with water supplied from said valve.

References Cited by the Examiner
UNITED STATES PATENTS 2,541,369  2/1951  Kofford _____ 119—72.5
3,043,267  7/1962  Blough _____ 119—75

FOREIGN PATENTS 882,414  11/1961  Great Britain.

SAMUEL KOREN, *Primary Examiner.*
HUGH R. CHAMBLEE, *Examiner.*